(12) United States Patent
Magro et al.

(10) Patent No.: US 6,260,081 B1
(45) Date of Patent: Jul. 10, 2001

(54) DIRECT MEMORY ACCESS ENGINE FOR SUPPORTING MULTIPLE VIRTUAL DIRECT MEMORY ACCESS CHANNELS

(75) Inventors: James R. Magro; Daniel P. Mann, both of Austin, TX (US); Floyd Goodrich, III, Portland, OR (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/198,797

(22) Filed: Nov. 24, 1998

(51) Int. Cl.$^7$ .............................. G06F 3/00; G06F 13/00
(52) U.S. Cl. .............................. 710/22; 710/40; 710/129; 709/230
(58) Field of Search .............................. 710/22, 40, 129; 709/230

(56) References Cited

U.S. PATENT DOCUMENTS

| | | | |
|---|---|---|---|
| 4,495,575 | * | 1/1985 | Eguchi .................................... 711/3 |
| 4,901,234 | * | 2/1990 | Heath et al. ........................... 710/40 |
| 5,619,727 | | 4/1997 | Chen et al. ............................ 710/22 |
| 5,832,246 | * | 11/1998 | Matsumoto ........................... 710/129 |
| 5,875,289 | * | 2/1999 | Woodruff et al. ........................ 714/9 |
| 6,026,443 | * | 2/2000 | Oskouy et al. ...................... 709/230 |

FOREIGN PATENT DOCUMENTS

| | | |
|---|---|---|
| 0 772 131 A2 | 5/1997 | (EP) . |
| 0 803 821 A2 | 10/1997 | (EP) . |
| 10093580 | 10/1998 | (JP) . |

OTHER PUBLICATIONS

*DMA Controller*, Advanced Micro Devices, Inc., Chapter 9, pp. 9–1 through 9–14.

*The Indispensable PC Hardware Book*, Second Edition, Hans–Peter Messmer, Chapter 25, pp. 598–621.

*International Search Report*, PCT/US99/14797, Oct. 13, 1999, 3 pp.

* cited by examiner

Primary Examiner—Thomas Lee
Assistant Examiner—Tammara Peyton
(74) Attorney, Agent, or Firm—Akin, Gump, Strauss, Hauer & Feld, L.L.P.

(57) ABSTRACT

A direct memory access engine supports multiple virtual direct memory access channels. The direct memory access engine includes a direct memory access controller and a parameter table in memory containing parameters for a plurality of virtual direct memory access channels. The controller engine provides a single physical direct memory access channel and a plurality of virtual direct memory access channels. One direct memory access channel of the plurality of virtual direct memory access channels may be active at a given time. The parameters for the active channel may be loaded from the parameter table to a physical direct memory access control block and a physical direct memory access channel resource of the direct memory access controller. The physical direct memory access control block of the direct memory access controller utilizes the physical direct memory access channel resource to perform a direct memory access transfer for the active channel based on the loaded parameters. The physical direct memory access channel resource is shared by the plurality of virtual direct memory access channels. The direct memory access engine further includes a direct memory access request line and a direct memory access acknowledge line for an active channel of the plurality of virtual direct memory access channels.

24 Claims, 3 Drawing Sheets

DIRECT MEMORY ACCESS ENGINE FOR SUPPORTING MULTIPLE VIRTUAL DIRECT MEMORY ACCESS CHANNELS

BACKGROUND OF THE INVENTION

1. Field of the Invention

The present invention relates to direct memory access control in microcontrollers, and more particularly to a direct memory access engine for supporting multiple virtual direct memory access channels.

2. Description of the Related Art

MICROCONTROLLERS

As technology advances, computer system components are providing specific services which previously were offered by a microprocessor or the computer system as a whole. A centerpiece of this advancing technology is known as a microcontroller, or embedded controller, which in effect is a microprocessor as used in a personal computer, but with a great deal of additional functionality combined onto the same monolithic semiconductor substrate (i.e., chip). In a typical personal computer, the microprocessor performs the basic computing functions, but other integrated circuits perform functions such as communicating over a network, controlling the computer memory, and providing input/output with the user.

In a typical microcontroller, many of these functions are embedded within the integrated circuit chip itself. A typical microcontroller, such as the Am186EM or AM186ES by Advanced Micro Devices, Inc., of Sunnyvale, Calif., not only includes a core microprocessor, but further includes a memory controller, a direct memory access (DMA) controller, an interrupt controller, and both asynchronous and synchronous serial interfaces. In computer systems, these devices are typically implemented as separate integrated circuits, requiring a larger area and increasing the size of the product. By embedding these functions within a single chip, size is dramatically reduced, often important in consumer products.

From a consumer products designer's viewpoint, often the particular combination of added features make a particular microcontroller attractive for a given application. Many microcontrollers are available that use the standard 80×86 microprocessor instructions, allowing for software to be easily developed for such microcontrollers. Because of the similar execution unit instruction sets, the added features often become principal differentiating criteria between particular microcontrollers.

In implementing microcontrollers in embedded systems, another common requirement or desirable feature is the reduction of the bandwidth needed by any particular portion of the microcontroller in negotiating with other portions. For example, the core of a microcontroller is the execution unit, which is essentially a microprocessor core. An execution unit should be free to perform the programmed task to which it is dedicated, rather than spending time waiting on other units within the microcontroller.

DIRECT MEMORY ACCESS

Often helpful in freeing up the execution unit are direct memory access (DMA) units, timer control units, and interrupt control units. Such units off-load the tasks of waiting for certain external transactions to take place, and, in the case of the DMA unit, actually off-loading the task itself. The DMA unit can be programmed to perform transfers between memory locations, between input/output ports, or between a memory location and an input/output port. Off-loading these tasks, the execution unit is freed from having to wait for such transfers to take place, and as such, can increase the overall speed of the computer system.

The DMA unit functions, without involving the microprocessor, by initializing control registers in the DMA unit with transfer control information. The transfer control information generally includes the source address (the address of the beginning of the block of data to be transferred), the destination address (the address where the beginning of the block of data is to be transferred), and the size of the data block. While both a microprocessor and a DMA unit may store data internally before distributing data to a proper address, a DMA unit may provide address and bus control signals to and from a peripheral or memory device such that the peripheral or memory device can access a peripheral or memory device for a read or a write cycle.

Specific channels are implemented in a DMA unit to allow peripheral or memory devices to transfer data (with or without internal data storage by the DMA unit) to or from other peripheral or memory devices. A channel can be activated via a DMA request signal (DREQ) from a peripheral or memory device. The DMA unit receives the DREQ, provides a DMA acknowledge signal (DACK) or simulated version thereof, and transfers the data over the channel to or from the peripheral or memory device. Peripheral devices which commonly use DMA channels include DRAM (dynamic random access memory) refresh circuitry, sound cards, SCSI host adapters, parallel ports, tape cards, network cards, modems, and floppy disk controllers.

Direct memory access channels have traditionally been supported in hardware and managed by control logic within a direct memory access controller. This control logic has typically taken the form of multiple registers (e.g., DMA command registers, DMA mode registers, DMA status registers, DMA mask registers, DMA request registers, DMA count registers, and DMA address registers) which take up valuable silicon space. Each direct memory access channel has been associated with its own portion of the control logic (e.g., DMA count registers and DMA address registers).

SUMMARY OF THE INVENTION

Briefly, the present invention provides a direct memory access engine for supporting multiple virtual direct memory access channels. The direct memory access engine includes a direct memory access controller and a parameter table in memory containing parameters for a plurality of virtual direct memory access channels. The direct memory access engine provides a single physical direct memory access channel and a plurality of virtual direct memory access channels. One channel of the plurality of virtual direct memory access channels may be active at a given time. The parameters for the active channel are loaded from the parameter table to the direct memory access controller. A physical direct memory access control block of the direct memory access controller utilizes a physical direct memory access channel resource to perform a direct memory access transfer for the active channel based on the loaded parameters. The physical direct memory access channel resource of the controller is shared by the plurality of virtual direct memory access channels. The direct memory access engine further includes a direct memory access request line and a direct memory access acknowledge line for an active channel of the plurality of virtual direct memory access channels.

The present invention eliminates the need for each direct memory access channel to be associated with its own control logic. In this way, memory is used to store direct memory access control information for a single direct memory access channel rather than consuming large areas of silicon with direct memory access control logic for multiple direct memory access channels.

BRIEF DESCRIPTION OF THE DRAWINGS

A better understanding of the present invention can be obtained when the following detailed description of the invention is considered in conjunction with the following drawings, in which.

DETAILED DESCRIPTION OF THE INVENTION

Figure 1:
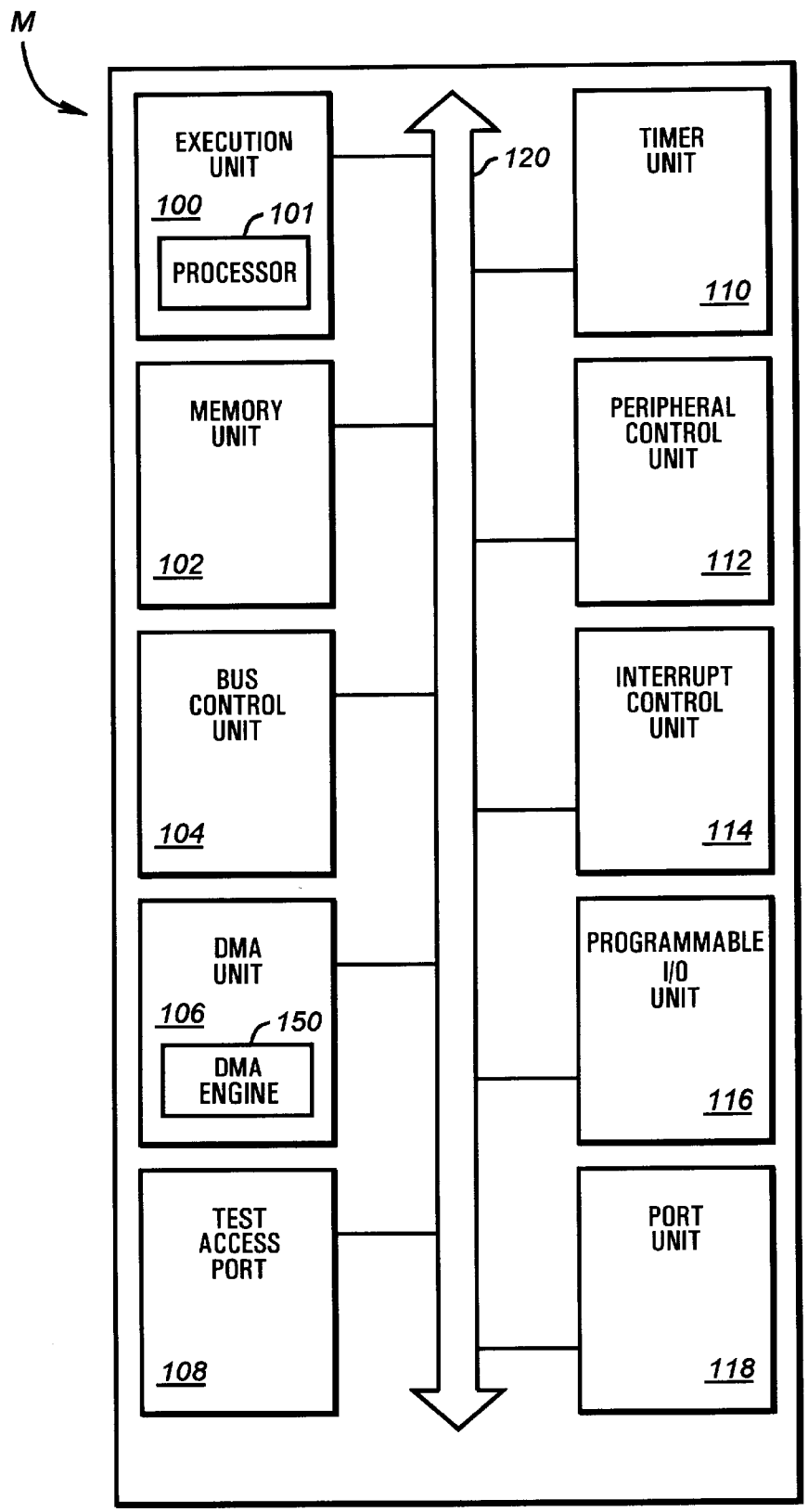
FIG. 1 block diagram of a microcontroller providing a direct memory access engine in accordance with the present invention.

Turning now to the drawings, FIG. 1 shows a block diagram of an exemplary architecture for a microcontroller M in accordance with the present invention. The microcontroller M may support a variety of on-chip units. In the illustrated architecture, an execution unit 100, a memory unit 102, a bus control unit 104, a direct memory access (DMA) unit 106, a test access port 108, a timer unit 110, a peripheral control unit 112, an interrupt control unit 114, a programmable I/O unit 116, and a port unit 118 are each coupled to a system bus 120. The system bus 120 may include a data bus, address bus, and control bus for communicating data, addresses and control information between any of these coupled units.

The execution unit 100 may provide a highly integrated processor 101 for executing code stored by the memory unit 102. The execution unit 100 in the disclosed embodiment is compatible with the Am186 instruction set implemented in a variety of microcontrollers from Advanced Micro Devices, Inc. of Sunnyvale, Calif. A variety of other execution units could be used instead of the execution unit 100.

The memory unit 102 may support multiple memory controllers for controlling communication of data to and from on-chip or off-chip memory devices. These memory devices for example may include dynamic random access memory (DRAM), read only memory (ROM), and/or flash memory. An example of a memory controller is a DRAM controller providing extended data out (EDO) and synchronous DRAM (SDRAM) support, write buffering support, and read-ahead buffering support.

The bus control unit 104 may provide a host of bus controllers for controlling a variety of buses and supporting the peripherals connected to those buses. These bus controllers for example may include a USB (Universal Serial Bus) controller, an ISA (Industry Standard Architecture) bus controller, a PCI (Peripheral Component Interconnect) bus controller, a General Purpose Bus controller, and/or a VL-Bus controller. The bus control unit 104 thus permits the microcontroller M to support a number of external buses and peripherals.

The DMA unit 106 may provide multiple DMA controllers having several DMA channels for controlling direct memory access transfers between the units of the microcontroller M. In accordance with the present invention, the DMA unit 106 provides a DMA engine 150 for supporting multiple virtual DMA channels. The test access port 108 provides a scan interface for testing the microcontroller M in a production environment and supports a test access port (TAP) controller for controlling test logic of the port 108.

The peripheral control unit 112 may provide a host of integrated peripheral controllers for controlling a variety of peripheral devices. These peripheral controllers, for example, may include a graphics controller, a keyboard controller, and/or a PC Card controller. The graphics controller preferably provides an internal unified memory architecture (UMA) and software compatibility with a variety of graphic adapters. The PC Card controller or adapter preferably conforms to PCMCIA (Personal Computer Memory Card International Association) standards.

The interrupt control unit 114 may provide multiple interrupt controllers for supporting several interrupt requests. Each interrupt controller may regulate issuance and acceptance of its associated interrupt requests. The programmable I/O unit 116 supports several general-purpose I/O pins. These pins provide a parallel interface for external devices to the microcontroller M. The port unit 118 may provide a standard parallel port interface, serial port interface, and/or infrared port interface. The parallel port interface may support an enhanced parallel port (EPP) mode for high speed transfers. The serial port interface and infrared interface may be driven by an industry-standard universal asynchronous receiver/transmitter (UART) so as to permit PC compatibility.

A variety of configurations and combinations of these units of the microcontroller M are possible. The microcontroller M, for example, could be the Am186™ ED microcontroller, the Elan™ SC400 microcontroller, or the Am186™ CC microcontroller. It should be understood that the disclosed units are illustrative and not exhaustive. A number of the illustrated units could be eliminated, or added to, without detracting from the spirit of the invention. Further, selection of the particular units supported by the microcontroller M may be a function of the particular microcontroller application. As an example, for a mobile computing application, an infrared port interface, graphics controller, and PC Card controller may be supported. As another example, for a communications application, a USB controller and an HLDC (High-Level Data Link Control) controller may be supported. The disclosed microcontroller M thus provides architectural flexibility.

The techniques and circuitry according to the invention could be applied to a wide variety of microcontrollers. The term "microcontroller" itself has different definitions in the industry. Some companies refer to a processor core with additional features (such as I/O) as "microprocessor" if it has no on-board memory, and digital signal processors (DSPs) are now used for both special and general purpose controller functions. As here used, the term "microcontroller" covers all of the products, and generally means an execution unit with added functionality all implemented on a single monolithic integrated circuit.

Figure 2:
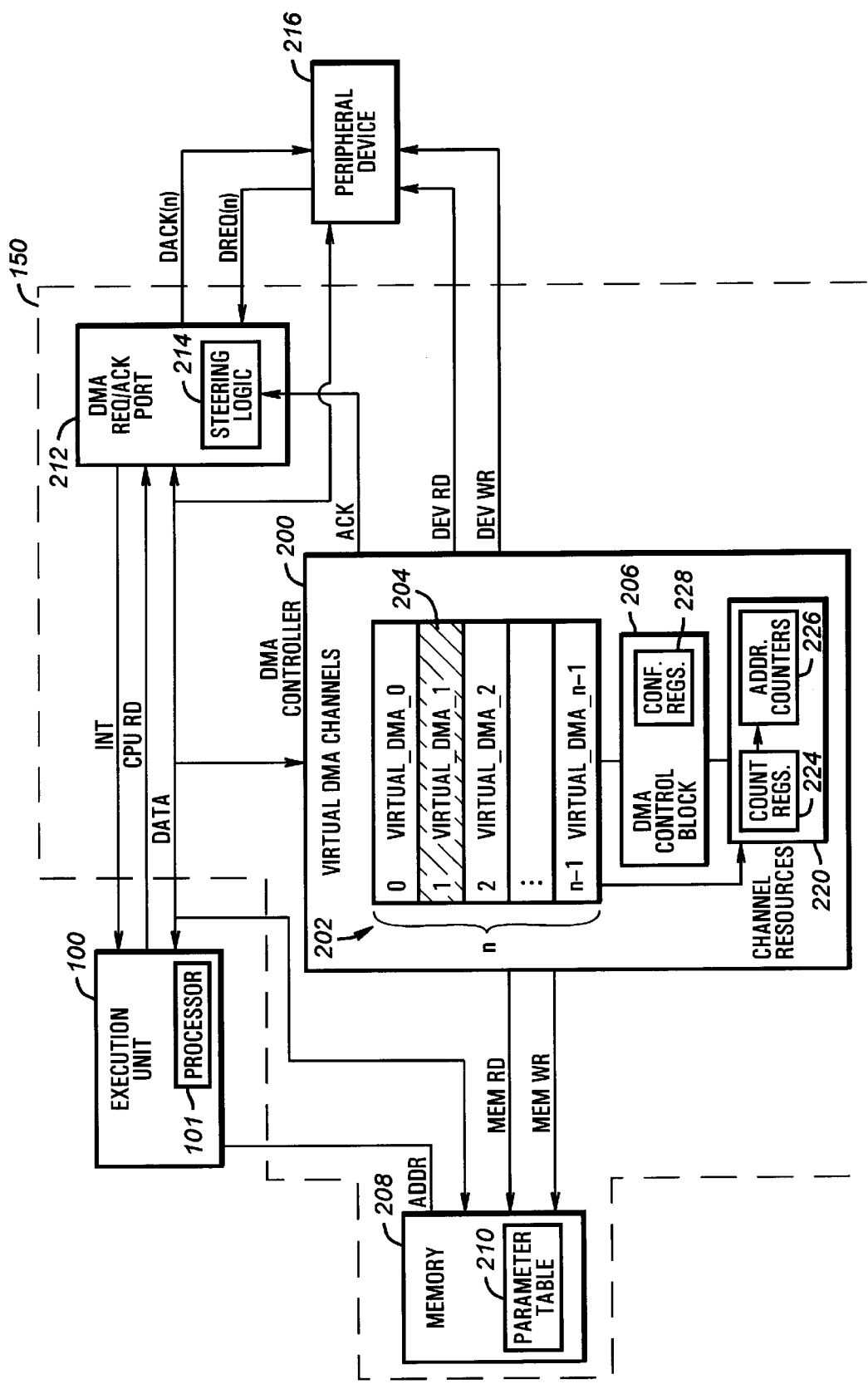
FIG. 2 is a schematic diagram of an exemplary direct memory access engine of FIG. 1 in accordance with the present invention.

Referring to FIG. 2, a schematic diagram of an exemplary DMA engine 150 for supporting multiple virtual DMA channels is shown. The DMA engine 150 provides a DMA controller 200 and a memory 208. The DMA controller 200 supports a single physical DMA channel 204 and a plurality of virtual DMA channels 202. The plurality of virtual DMA channels 202 are represented as n (n being any integer)

virtual DMA channels. One channel of the plurality of virtual DMA channels 202 may be active at a given time. The active virtual DMA channel utilizes the single physical DMA channel 204. The physical DMA channel 204 thus is alternated among the plurality of virtual DMA channels 202. In FIG. 2, the physical DMA channel 204, indicated by diagonal references lines, is shown as corresponding to a VIRTUAL_DMA_1 channel.

A DMA transfer by an active virtual DMA channel 202 is controlled by a physical DMA control block 206 of the DMA controller 200. The physical DMA control block 206 may include any combination of five standard types of configuration registers 228: DMA mode registers, DMA status registers, DMA mask registers, DMA request registers, and DMA command registers. At any given time, the physical DMA control block 206 may be configured to accommodate a virtual DMA channel 202 that utilizes the physical DMA channel 204. The DMA controller 200 further includes a physical DMA channel resource 220. During a programming state of the DMA controller 200, the physical DMA channel resource 220 and the physical DMA control block 206 are programmed with parameters for a DMA transfer by an active virtual DMA channel. The physical DMA channel resource 220 is configured to only accommodate a single physical DMA channel 204. In the disclosed embodiment, the physical DMA channel resource 220 may include a set of DMA transfer control resources, such as DMA transfer count registers 224 and DMA address counters (source and destination) 226, for a single DMA channel. Alternatively, in accordance with the present invention, the DMA controller 200 may support any number of physical DMA channels 204 shared by a larger number of virtual DMA channels 202. Like the physical DMA channel 204, use of the physical DMA channel resource 220 is alternated among the plurality of virtual DMA channels 202. The physical DMA channel resource 220 is preferably configured to minimize hardware.

The DMA controller 200 is further coupled to a memory 208 and a peripheral device 216. The DMA controller 200 provides a memory read signal MEM RD and a memory write signal MEM WR to the memory 208. A peripheral read signal DEV RD and a peripheral write signal DEV WR are provided by the DMA controller 200 to the peripheral device 216. The memory 208 provides a parameter table or similar data arrangement 210 for storing parameters for the plurality of virtual DMA channels 202. The parameters for the plurality of virtual DMA channels 202 may be loaded to the parameter table 210 by the execution unit 100. The memory 208 provides an address line ADDR to the execution unit permitting the execution unit 100 to address the parameter table 210. When a virtual DMA channel 202 becomes active, the parameters for the particular virtual DMA channel 202 are provided from the parameter table 210 to the physical DMA channel resource 220 and to the physical DMA control block 206. In the disclosed embodiment, the relevant parameters are loaded to the physical DMA resource 220 of the DMA controller 200 by the execution unit 100. The DMA controller 200 performs a DMA transfer based on the loaded parameters. During a DMA transfer, the DMA controller 200 owns a local data bus DATA coupled to the memory 208, the peripheral device 216 and the execution unit 100.

It should be understood that at least four types of DMA transfers are possible in the disclosed embodiment: a memory-peripheral device transfer, a peripheral-memory device transfer, a memory-memory device transfer, and a peripheral-peripheral device transfer. A memory-peripheral device transfer is a data transfer from the memory device 208 to the peripheral device 216 in accordance with the memory read signal MEM RD and the peripheral write signal DEV WR. A peripheral-memory device transfer is a data transfer from the peripheral device 216 to the memory device 208 in accordance with the peripheral read signal DEV RD and the memory write signal MEM WR.

A memory-memory device transfer is a data transfer from one memory address area of the memory device 208 to another memory address area of the memory device 208 in accordance with the memory read signal MEM RD and the memory write signal MEM WR. A peripheral-peripheral device transfer is a data transfer from an I/O address area of the peripheral device 216 to another I/O address area of the peripheral device 216 in accordance with the peripheral read signal DEV RD and the peripheral write signal DEV WR. A memory-memory device transfer or a peripheral-peripheral device transfer may include a read phase, an internal data storage phase, and a write phase. In the read phase, a read address is applied to a memory 208 or peripheral device 216. Next, the read data may be stored by a temporary register (not shown) of a DMA controller 200. A write address is then applied to the memory 208 or peripheral device 216. Alternatively, a memory-memory transfer or a peripheral-peripheral transfer may be performed without a temporary register. While a single memory device 208 and a single peripheral device 216 are illustrated for simplicity, the DMA controller 150 may also control DMA transfer among a plurality of memory devices and a plurality of peripheral devices. In the disclosed embodiment, a virtual DMA channel 202 may be allocated to the memory device 208 or the peripheral device 216.

The DMA engine 150 further includes a DMA request/acknowledge port block 212. In the disclosed embodiment, the DMA request/acknowledge port block 212 may receive a request signal DREQ(n) from the peripheral device 216 or the memory device 208. A device provides a DMA request signal DREQ(n) to the DMA request/acknowledge port block 212 to request a DMA transfer. The DMA request/acknowledge port block 212 may supply a DMA acknowledge signal DACK(n) to the peripheral device 216 or the memory device 208. An active DMA acknowledge signal DACK(n) indicates a virtual DMA channel 202 is enabled and the corresponding device that issued the DMA request is being serviced.

Figure 3:
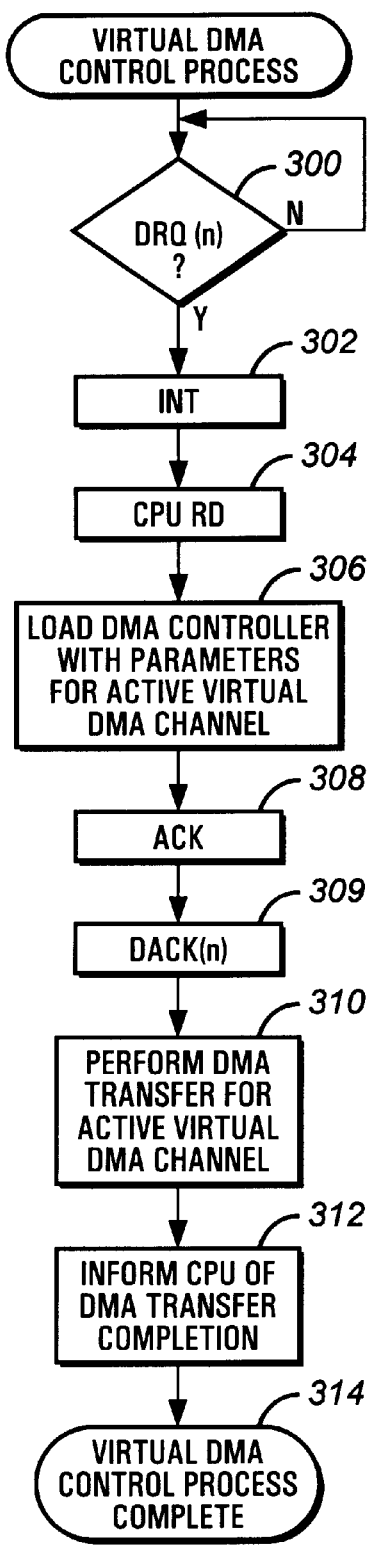
FIG. 3 is a flow chart of an exemplary virtual direct memory access control process in accordance with the present invention.

Referring to FIG. 3, a flow chart of an exemplary virtual DMA control process is shown. The exemplary virtual DMA control process represents the initialization and execution of a DMA transfer by a virtual DMA channel 202. Beginning in step 300, it is determined if a direct memory access request signal DRQ(n) has been asserted by the peripheral device 216 or the memory device 208 to the DMA request/acknowledge port block 212. If no DRQ(n) is asserted or active, control remains at step 300. If a DRQ(n) is active, control proceeds to step 302 where an interrupt signal INT is provided by the DMA request/acknowledge port block 212 to the execution unit 100. Next, in step 304, the execution unit 100 provides a CPU read signal CPU RD to read the DMA request/acknowledge port block 212 and determine which device has requested service. From step 304, control proceeds to step 306 where the DMA controller 200 is loaded with parameters for the virtual DMA channel 202 located for the DMA transfer. The parameters are loaded from the parameter table 210 to the DMA control block 206 and the physical DMA resource 220. A portion of the parameters may be loaded to the DMA control block 206, and a portion of the parameters may be loaded to the physical DMA channel resource 220.

The DMA engine 150 may further include a DMA arbiter (not shown) for selecting a virtual DMA channel 202 among multiple virtual DMA channel requests in accordance with a particular arbitration scheme. If multiple direct memory access request signals DRQ(n) go active at the same time, the direct memory access request DRQ(n) with the highest priority is selected.

Next, in step 308, the DMA controller 200 acknowledges the requesting device with a general acknowledge signal ACK. In step 309, an acknowledge signal DACK(n) is asserted to the requesting device by the DMA request/acknowledge port block 212 to enable or activate the allocated or active virtual DMA channel 202. The appropriate DACK(n) signal is determined by steering logic 214 of the DMA request/acknowledge port block 212. The steering logic 214 essentially detects the general acknowledge signal ACK corresponding to the allocated or active virtual DMA channel 202 so that a corresponding acknowledge signal DACK(n) may be provided to the requesting device. Prior to this steering phase, the acknowledge signal DACK(n) is shared in a virtual sense at a physical level by the plurality of virtual DMA channels 202. At a physical level, the physical DMA channel 204 virtually shares a general acknowledge signal ACK. The general acknowledge signal ACK is steered to the appropriate DACK(n) signal.

In step 310, the DMA transfer for the active virtual DMA channel 202 is performed based on the parameters loaded to the physical DMA control block 206 and the physical DMA channel resource 220. From step 310, control proceeds to step 312 where the execution unit 100 is informed of completion of the virtual DMA operation such as by an interrupt. Control terminates through step 314 where the virtual DMA control process is complete.

Thus, the present invention provides a direct memory access engine 150 for supporting multiple virtual direct memory access channels 202. The direct memory access engine 150 includes a direct memory access controller 200 and a parameter table 210 in memory 208 containing parameters for a plurality of virtual direct memory access channels 202. The direct memory access engine 150 provides a single physical direct memory access channel 204 and a plurality of virtual direct memory access channels 202. One channel of the plurality of virtual direct memory access channels 202 may be active at a given time. The parameters for the active channel 202 are loaded from the parameter table 210 to the direct memory access control block 206 and the physical direct memory access channel resource 220 of the direct memory access controller 200. The physical direct memory access control block 206 utilizes the physical DMA channel resource 220 to perform a direct memory access transfer for the active channel 202 based on the loaded parameters. The physical DMA channel resource 220 is shared by the plurality of virtual direct memory access channels 202. The direct memory access engine 150 further includes a direct memory access request line DREQ(n) and a direct memory access acknowledge line DACK(n) for an active channel 202 of the plurality of virtual direct memory access channels 202.

It should be understood that the DMA controller 200 may support multiple physical DMA channel resources 200 and multiple physical DMA control blocks 206 to accommodate any number of physical DMA channels 204 shared by a larger number of virtual DMA channels 202.

The present invention eliminates the need for each direct memory access channel to be associated with its own control logic. In this way, memory is used to store direct memory access control information for a single direct memory access channel rather than consuming large areas of silicon with direct memory access control logic for multiple direct memory access channels.

The foregoing disclosure and description of the invention are illustrative and explanatory thereof, and various changes in the components, circuit elements, signals, registers, and connections, as in the details of the illustrated circuitry and construction and method of operation may be made without departing from the spirit of the invention.

What is claimed is:

1. A direct memory access engine for supporting multiple virtual direct memory access channels, comprising:
   a direct memory access controller, comprising:
      a physical direct memory access control block;
      a physical direct memory access channel resource;
      a physical direct memory access channel coupled to the physical direct memory access control block and the physical direct memory access channel resource;
      a plurality of virtual direct memory access channels coupled to the physical direct memory access control block and sharing the physical direct memory access channel, the physical direct memory access control block, and the physical direct memory access channel resource; and
      a memory including a parameter table storing parameters for the plurality of virtual direct memory access channels.

2. The direct memory access engine of claim 1, wherein an execution unit loads parameters for an active virtual direct memory access channel of the plurality of virtual direct memory access channels from the parameter table to the physical direct memory access channel resource and the physical direct memory access control block.

3. The direct memory access engine of claim 1, wherein one channel of the plurality of virtual direct memory access channels is active at a given time.

4. The direct memory access engine of claim 1, wherein the physical direct memory access resource and the physical direct memory access control block store parameters for an active virtual direct memory access channel of the plurality of virtual direct memory access channels.

5. The direct memory access engine of claim 1, wherein the direct memory access controller performs a direct memory access transfer for an active virtual direct memory access channel of the plurality of virtual direct memory access channels over the physical direct memory access channel based on the parameters.

6. The direct memory access engine of claim 1, comprising:
   a direct memory access request line for an active channel of the plurality of virtual direct memory access channels.

7. The direct memory access engine of claim 1, comprising:
   a direct memory access acknowledge line for an active channel of the plurality of virtual direct memory access channels.

8. A microcontroller for supporting multiple virtual direct memory access channels, comprising:
   an execution unit;
   a direct memory access unit coupled to the execution unit, comprising:
      a direct memory access engine, comprising:
         a physical direct memory access control block;
         a physical direct memory access channel resource;
         a physical direct memory access channel coupled to the physical direct memory access control block and the physical direct memory access channel resource;

a plurality of virtual direct memory access channels coupled to the physical direct memory access control block and sharing the physical direct memory access control block and the physical direct memory access channel resource; and a memory including a parameter table storing parameters for the plurality of virtual direct memory access channels.

9. The direct memory access engine of claim 7, wherein an execution unit loads parameters for an active virtual direct memory access channel of the plurality of virtual direct memory access channels from the parameter table to the physical direct memory access channel resource and the physical direct memory access control block.

10. The microcontroller of claim 8, wherein one channel of the plurality of virtual direct memory access channels is active at a given time.

11. The microcontroller of claim 8, wherein the physical direct memory access channel resource and the physical direct memory access control block store parameters for an active virtual direct memory access channel of the plurality of virtual direct memory access channels.

12. The microcontroller of claim 8, wherein the direct memory access controller performs a direct memory access transfer for an active virtual direct memory access channel of the plurality of virtual direct memory access channels over the physical direct memory access channel based on the parameters.

13. The microcontroller of claim 8, the direct memory access engine comprising:

a direct memory access request line for an active channel of the plurality of virtual direct memory access channels.

14. The microcontroller of claim 8, the direct memory access engine comprising:

a direct memory access acknowledge line for an active channel of the plurality of virtual direct memory access channels.

15. The microcontroller of claim 8, the direct memory access engine including a direct memory access request line for an active channel of the plurality of virtual direct memory access channels and a direct memory access acknowledge line for an active channel of the plurality of virtual direct memory access channels, further comprising:

a direct memory access request/acknowledge port block coupled to the direct memory access engine for receiving the direct memory access request line and providing the direct memory access acknowledge line.

16. The microcontroller of claim 15, the direct memory access request/acknowledge port block comprising:

steering logic for directing a direct memory access acknowledge signal corresponding to the active virtual direct memory access channel from the direct memory access controller to the direct memory access acknowledge line.

17. The microcontroller of claim 15, further comprising:

a device coupled to the direct memory access request/acknowledge port block for providing a direct memory access acknowledge signal to the direct memory access request acknowledge port block and receiving a direct memory access acknowledge signal from the direct memory access request/acknowledge port block.

18. A method of controlling a direct memory access transfer using a direct memory access controller engine for supporting multiple virtual direct memory access channels, the direct memory access engine including a direct memory access controller having a physical direct memory access control block, a physical direct memory access channel resource, a physical direct memory access channel, and a plurality of virtual direct memory access channels, the plurality of virtual direct memory access channels sharing the physical direct memory access channel, the physical direct memory access control block, and the physical direct memory access channel resource, the direct memory access controller engine further including a memory having a parameter table for storing parameters for the plurality of virtual direct memory access channels, the method comprising the steps of:

loading the direct memory access controller with parameters from the parameter table for a first active virtual direct memory access channel of the plurality of virtual direct memory access channels; and performing a direct memory access transfer for the first active virtual direct memory access channel over the physical direct memory access channel based on the parameters loaded to the direct memory access controller.

19. The method of claim 18, further comprising the step of:

loading the direct memory access controller with parameters from the parameter table for a second active virtual direct memory access channel of the plurality of virtual direct memory access channels; and performing a direct memory access transfer for the second active virtual direct memory access channel over the physical direct memory access channel based on the parameters loaded to the direct memory access controller.

20. The method of claim 18, wherein the loading step is performed by an execution unit.

21. The method of claim 18, wherein the step of performing a direct memory access transfer is controlled by the direct memory access control block.

22. The method of claim 18, further comprising the step of:

providing the direct memory access engine in a microcontroller.

23. The method of claim 18, the loading step comprising the step of:

loading a portion of the parameters to the physical direct memory access channel resource.

24. The method of claim 18, the loading step comprising the step of:

loading a portion of the parameters to the physical direct memory access control block.

* * * * *